United States Patent
Gilbert

[11] 3,987,305
[45] Oct. 19, 1976

[54] LOW SELF-BIAS VARIABLE GAP DIODE
[75] Inventor: Raine M. Gilbert, Centreville, Va.
[73] Assignee: The United States of America as represented by the Secretary of the Army, Washington, D.C.
[22] Filed: June 10, 1975
[21] Appl. No.: 585,628

[52] U.S. Cl. ............................... 250/374; 250/395; 250/385
[51] Int. Cl.² ............................................. G01T 1/18
[58] Field of Search ........... 250/374, 375, 378, 385, 250/336, 395

[56] References Cited
UNITED STATES PATENTS

| | | | |
|---|---|---|---|
| 2,440,167 | 4/1948 | Broxon | 250/375 |
| 2,521,656 | 9/1950 | Segre et al. | 250/374 |
| 2,824,252 | 2/1958 | Redman et al. | 250/374 |
| 3,271,691 | 9/1966 | Hendon | 250/374 |

Primary Examiner—Alfred E. Smith
Assistant Examiner—Tommy P. Chin
Attorney, Agent, or Firm—Nathan Edelberg; Robert P. Gibson; Saul Elbaum

[57] ABSTRACT

A parallel-plate variable-gap diode is described which is used to detect X and gamma radiation pulses. The collector of the diode is comprised of an interior circular portion and a concentric external annular portion, the collecting surfaces of which are coplanar and noncontiguous. A shielded low-inductance resistor-ring shunts the bulk of the sampled current back through the annular portion of the collector to the emitter thereby reducing self-bias effects. The central location and relatively small size of the current sampler minimize the perturbing influence of the walls at the periphery of the cavity. A one-dimensional electron transport analysis can therefore provide the link between the incident radiation and the observed current response of the diode. The cylindrical walls of the cavity are interchangeable spacers which permit the variation of separation between emitter and collector.

9 Claims, 4 Drawing Figures

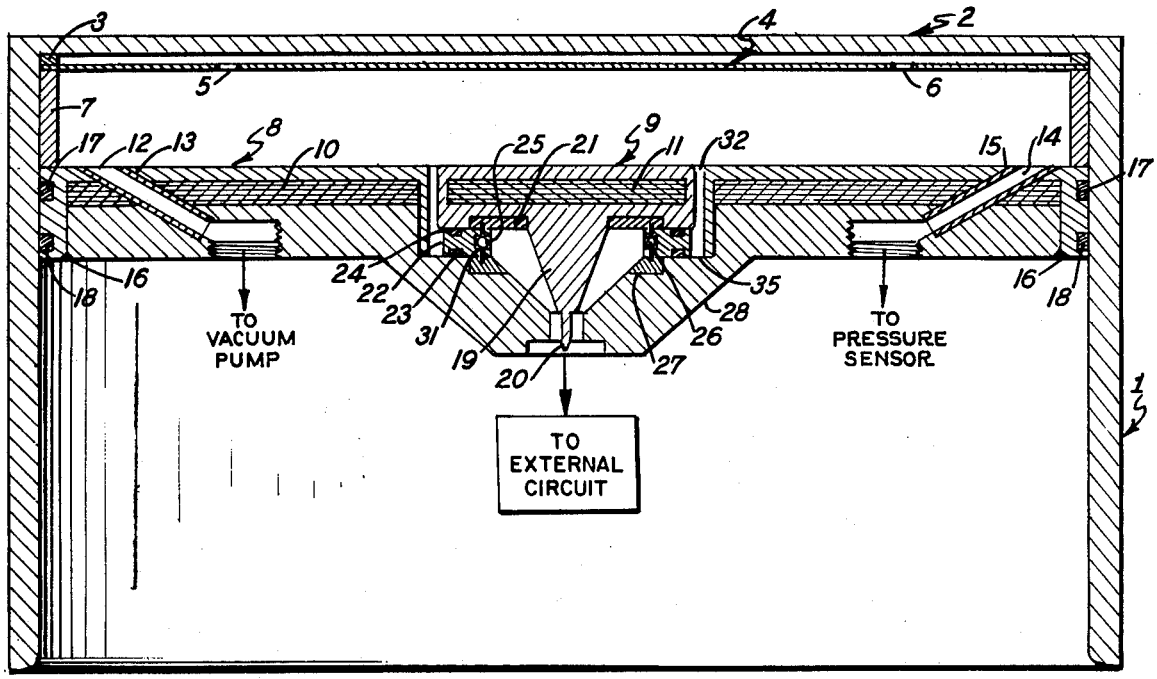
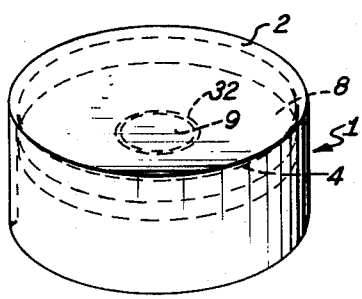
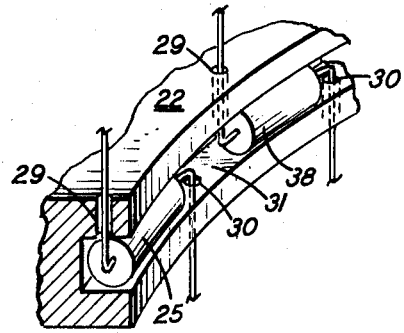
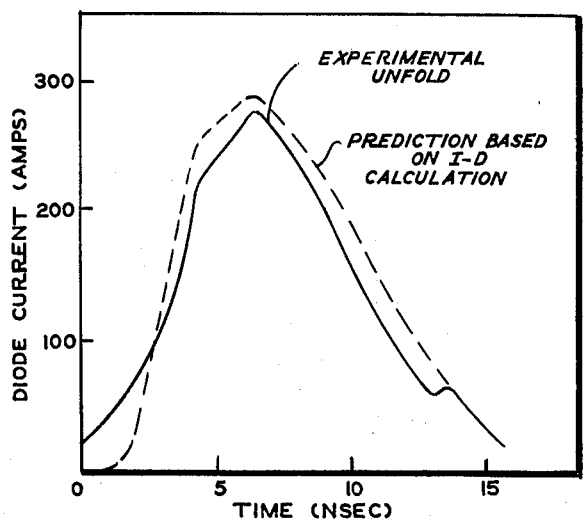

LOW SELF-BIAS VARIABLE GAP DIODE

RIGHTS OF THE GOVERNMENT

The invention described herein may be manufactured, used, and licensed by or for the United States Government for governmental purposes without the payment to me of any royalty thereon.

The present invention relates to an improved parallel plate diode for the detection of X and gamma radiation.

The general type of diode with which the present invention is concerned is comprised of a metallic emitter, and a metallic collector which is parallel to the emitter and is separated therefrom by an air space. Photons of X or gamma radiation penetrate the metallic emitter and dislodge electrons from the inside surface thereof with a momentum sufficient to propel them to the collector which absorbs them. A portion of the collector current is fed to external circuitry and the amplitude thereof corresponds to the intensity of photon radiation. The collector may be connected to either an external measuring or triggering circuit.

Diodes of this type are frequently used for diagnostic purposes. It may, for instance, be of interest to study the generation and transmission of radiation induced current pulses as a function of the emitter material, air ionization density, air pressure or plate separation. Other experimental uses will be apparent to those skilled in the art and these too may be of interest. Of course, each of the experiments may have a theory which is relevant to it and one purpose of the experiments may be to confirm the theory in the case of an unconfirmed theory or to see how well the theory predicts the outcome of the experiment in the case of a confirmed theory. In working with these theories it is of great advantage to be able to use a one-dimensional analysis of electron transport in the cavity between the emitter and the collector, the one dimension being perpendicular to the emitter and the collector. Because of effects to be discussed later in the specification, prior art parallel plate diodes have not behaved in one-dimensional fashion which has necessitated the use of the more complex two-dimensional theory in the theoretical computations.

It is thus an object of the invention to provide a parallel plate diode which operates approximately according to a one-dimensional theory of electron transport.

It is a further object of the invention to provide a parallel plate diode having a low self-bias.

It is still a further object of the invention to provide a parallel plate diode having an emitter-collector spacing which can be changed.

It is still a further object of the invention to provide a parallel plate diode which can be used to study the generation and transmission of radiation-induced current pulses as a function of emitter material, air ionization density, air pressure and plate separation using a non-perturbed one-dimensional analysis.

The above objects are accomplished by providing a parallel plate diode having a cylindrical geometry wherein the collector is divided into an interior circular portion adapted for connection to an exterior circuit and an exterior annular portion which is separated from the interior portion by an air gap and a low-inductance resistor ring. The relatively small diameter and central (axial) location of the interior portion ensures that the electrons collected by the interior portion are unperturbed by the metallic cylindrical spacing elements at the periphery of the diode cavity and hence that they behave more in accordance with one-dimensional theory than those moving in the peripheral space of the cavity. Additionally, since prior devices had relatively high impedances between emitter and collector and, consequently, strong negative self-biasing of the collector which caused electron-transport perturbations, the present device is provided a means for causing most of the interior portion collector current to be shunted back to the emitter, thus ensuring a low self-bias and the elimination of significant perturbations. The shunting means is comprised of a reactor ring situated below the interior portion of the collector which ensures that the current flow out of the collector is symmetrical. The emitter and collector of the present device are mounted in a piston-like cylindrical housing and the separation therebetween may be changed by changing the cylindrical spacers which are utilized.

The invention will be better understood by referring to the following description in conjunction with the figures in which:

FIG. 1 is an external perspective view of the diode of the invention.

FIG. 2 is a cross-section of FIG. 1 taken through a diameter of endplate 2 and cylindrical housing 1 which shows the detailed structure of the diode.

FIG. 3 is a detailed view of ring 22 of FIG. 2.

FIG. 4 is a graph comparing experimental results with the results predicted by theory using a one-dimensional calculation.

Referring to FIGS. 1 and 2 the improved parallel plate diode of the invention is shown. The diode is housed in cylindrical aluminum housing 1 having a circular endplate 2 through which incoming radiation penetrates. Referring to FIG. 2, the diode has a circular emitter 4 which can be made of a variety of metals, for instance aluminum, lead or tantalum. If it is desired to study the effect of the emitter material on the output pulse then emitters made of different materials may be used successively with the diode to effect such a study. The emitter is disposed a short distance inside of end housing plate 2 and the spacing is effected by cylindrical spacing member 3 which may be made of a metallic material.

The collector is spaced from the emitter by cylindrical metallic spacer 7 and is comprised of an interior circular portion 9 and an exterior annular portion 8 which is separated from the interior portion by an air gap 32. The collector may be made of a variety of metals, such as for instance aluminum, and the exterior and interior portions contain lead inserts 10 and 11 respectively. Lead insert 11 may be round and may extend almost to the periphery of interior portion 9 in all diametrical directions. Lead insert 10 may have an annular disk shape and extend almost to the inside and outside diameters of annular portion 8 in all directions. The exterior portion of the collector may be constructed of two metallic parts which abut either side of the lead as shown, or of a single metallic part with lead fill.

The exterior portion of the collector is pressure fitted into the cavity by means of O-rings 17 and 18. Other mechanical means of securing the annular portion of the collector in the housing will be apparent to those skilled in the art and are within the scope of the present invention.

The bottom part of the interior portion 9 of the collector is made in the form of a conical taper 19 having a prong 20 at the end thereof and this part of the collector is arranged to have an impedance which is equal to the characteristic impedance of the cable which will be connected thereto. The bottom part 28 of the exterior portion 8 of the collector is also made in the form of a conical taper. An insulator ring 22 containing O-rings 23 and 24 and the resistor ring 21-26 is secured between the exterior portion in the following fashion.

The circular elements 21 and 27 which sandwich the insulator ring 22 are threaded on their periphery as are the surfaces of the inner portion 9 and exterior portion 8 to which the threaded surfaces of elements 21 and 27 are contiguous, such threading serving to fix the inner portion 9 in place. An alternative to such means of securing the inner portion 9 to the exterior portion 8 is the use of several screws through element 21 into the rear surface of the inner collector 9 and a like number of screws through element 27 into the rear internal surface of exterior portion 8. In either case, the circular elements 21 and 27, and thereby the inner portion 9 and exterior portion 8, are connected to each other through the resistor-ring resistance by the soldering or clamping of resistor leads to the circular elements 21 and 27 as described below.

Insulator ring 22 has a groove 31 running along its inside surface and a resistor ring including resistors 25 and 26 is secured therein. The more detailed structure of this resistor ring as well as its function will be explained below. The exterior portion of the collector has two passages disposed therein and in the embodiment shown in FIG. 2 these passages are diametrically opposed from each other. The left-hand passage 12 in FIG. 2 is bounded by cylindrical sleeve 13 and the right-hand passage 14 is bounded by cylindrical sleeve 15. These sleeves may be constructed of aluminum and the function of the passages is to facilitate control and measurement of the air pressure in the space between the emitter and the collector.

In the operation of the diode, X or gamma radiation is incident on end plate 2 of the device and a portion of the incident photons pass through the end plate to the inside surface of the emitter. Some of these photons are absorbed there and impart energy to electrons at the inside surface of the emitter in FIG. 2. This energy causes the electrons to leave the surface of the emitter with a momentum which is generally sufficient to carry them across the air space of the diode to the collector.

In the embodiment shown in FIG. 2 it is desired to minimize the back production of electrons from the collector and this is why aluminum is chosen as the collector material. However, in other embodiments it may be desirable to utilize back production (for instance, it may be of interest to measure the back production), and in this case materials which result in a greater back production of electrons may be used. The collector is filled with lead to insure that radiation does not pass through the collector as well as the emitter, which would result in electrons being emitted from the back surface of the collector which electrons would cancel the electrons entering the collector from the emitter. The lead inserts also prevent photons from penetrating the resistor ring and altering the value of the ring resistance.

In the diodes of the prior art, the sensing surface of the collector was as large as or larger than the emitting surface of the emitter and carried a cupping rim on its periphery to prevent dispersion of electrons before their capture by the collector. The collector therefore sensed substantially all of the electrons emitted by the emitter. The problem with this arrangement is that the electrons closer to the metallic cupping rim become perturbed and the electrons no longer behave according to a one-dimensional theory of transport necessitating the use of more complex two-dimensional theory in the theoretical analysis. The reason for the perturbations is that every metal has free electrons and the free electrons in the cupping rim of the prior art diode interact with the electrons in the air space closest to the rim causing the path of travel of these electrons to deviate from the ideal one-dimensional case.

According to the structure of the invention, the perturbations referred to above are eliminated by separating the circular interior portion of the collector 9 from the exterior annular portion of the collector 8 and using only the portion 9 as a sensing element for the electrons. Thus a portion of the electrons sampled by portion 9 are fed to external circuitry as the output of the device while the electrons collected by the external portion 8 are not. Thus, in effect the electrons flowing from the emitter to the interior sensing portion of the collector are kept in their proper place by a cushion of non-sensed electrons which surrounds them. The result is that the emitter and the sensing portion of the collector behave as an infinite parallel plate device and a one-dimensional theory of electron transport may be used in explaining the behavior of the device. In the embodiment of the invention shown, the diode has a diameter of 9 inches and the diameter of the sensing portion 9 of the collector is 2 inches. Of course, it is to be understood that the relative diameters of sensing portion 9 and the entire collector may be varied to ascertain the optimal ratio in any given situation.

The bottom part 19 of the interior collector portion is conically tapered and ends in point 20 which forms an effective plug which may be accommodated by a socket. The diode must not only be physically compatible with external circuitry but, since the radiation detected frequently occurs in fast pulses producing fast current pulses, the diode must also be designed to minimize reflections inside the diode and at the diode-cable interface. This requires that the diode tapers and connector be impedance-matched to the cable which will carry the current from the diode. Hence, portion 19 of the collector must have a characteristic impedance which is equal to the characteristic impedance of the cable, and in the usual case this is 50 ohms.

In the prior art, all of the current collected by the collector was fed down through a portion such as conical portion 19 to the external circuitry. This caused a serious problem in that because of the relatively high characteristic impedance of 50 ohms, the collector became highly reverse self-biased (current X characteristic impedance) and the reverse self-bias was sufficient to prevent some electrons emitted from the emitter from reaching the collector and therefore resulted in perturbations of the electron flow. In the present device, this situation is remedied by providing a shunting means which shunts most of the collector current back to the emitter and allows only a small portion of the collector current to be fed to the external circuitry. Since the magnitude of the sensed current is substantially decreased, the self-bias of the device is substantially decreased and the perturbations referred to above are virtually eliminated. While the current output of the device is smaller than in the prior art arrangement, it has been found that the larger currents are frequently not necessary.

The shunting means of the embodiment of FIG. 2 is a resistor ring which is disposed beneath the interior portion of the collector. Referring to FIG. 2, insulator ring 22, secured between the bottom of collector portion 9 and ledge 35, carries O-rings 23 and 24 in order to isolate the air pressure maintained in the diode cavity from the ambient air pressure. As shown more clearly in FIG. 3 which is a perspective view of a part of the ring, groove 31 is disposed in the interior surface thereof and a low-inductance resistor ring is disposed in this groove. While if desired the resistor ring may be a continuous ring of resistor material, in the embodiment shown in FIGS. 2 and 3 the ring is comprised of a plurality of discrete resistors 25 disposed around groove and connected in parallel with each other. The resistors may be evenly distributed around the groove to ensure that the current flow from the collector is symmetrical. Brass ring 21 is disposed in the bottom surface of collector 9 and brass ring 27 is disposed in ledge 35. On lead from each of the resistors is connected to ring 21 and the other lead is connected to ring 27, thus placing all of the resistors in parallel. The top side of ring 22 has holes 29 as shown in FIG. 3 and the bottom sides has holes 30 for passage of the resistor leads, and brass rings 21 and 27 may have a plurality of corresponding holes in which the resistor leads may be soldered. In one embodiment of the invention where the impedance of conically tapered portion 19 is 50 ohms, ten 10-ohm resistors were disposed around the ring and connected in parallel to form an effective resistance of one ohm. In this case, since the impedance of the ring path is 1/50th the impedance of the conical taper path, only 1/50th of the interior portion collector current is fed to the external circuitry, where as 49/50ths is fed back to the emitter through the external portion of the collector and spacer 7. This substantially reduces the reverse self-bias of the device and reduces the perturbations referred to above.

It may be desirable to vary the spacing of the emitter and the collector, for instance, if it is of interest to experimentally determine the effect of spacing on the pulse current output of the device. According to the structure shown, the collector is pressure fitted in the cavity with O-rings 17 and 18 and may be removed and the spacer 7 shown may be replaced if desired with a cylindrical spacer 7 having a different length.

Additionally, it may be desirable to determine the pulse current output as a function of the air pressure in the air space between the collector and the emitter or of the air ionization. Passages 12 and 14 are provided and a vacuum pump may be fitted to passage 12 to control the pressure in the air space while a pressure sensor may be fitted to passage 14 to determine the pressure of the air in the space. The device can operate as shown over a range from hard vacuum to atmospheric pressure and, with external clamping of the collector using clamps of a nature apparent to those skilled in the art, can operate at pressures in excess of several atmospheres. Passages 13 and 14 are provided primarily for experimentation. Emitter 4 is provided with vents 5 and 6 to prevent the emitter from bowing when the pump is first applied. The number of vents as well as the size thereof which is best for any application may be determined by experimentation.

The diode is constructed so as to facilitate interchangeability of emitters and resistor rings for purposes of experimentation.

An actual example of how well one-dimensional theory predicts the shape and amplitude of an actual current pulse generated by the device is shown in FIG. 4. The abscissa of the graph is time and the ordinate is diode current, the dotted pulse representing the prediction based on the one-dimensional theory and the solid pulse representing the experimentally measured pulse. It is seen that the one-dimensional prediction is an accurate approximation of the actual pulse.

A parallel plate radiation detecting diode, which operates according to an approximate one-dimensional theory of electron transport and which is useful for diagnostic testing as well as triggering, has thus been provided.

I wish it to be understood that I do not desire to be limited to the exact details of construction shown and described, for obvious modifications can be made by a person skilled in the art.

I claim:

1. In a radiation detection diode for detecting X and gamma radiation including a circular plane metallic emitter separated by an air space from a circular metallic collector which is parallel to said emitter, said air space being enclosed by a cylindrical metallic member which connects said emitter and said collector at their peripheries, the improvement wherein said collector is divided into an interior circular portion adapted for connection to an external circuit and an exterior annular portion which is separated from said interior portion by an annular gap, whereby the electrons collected by said interior portion are unperturbed by said cylindrical metallic member and behave approximately in accordance with a one-dimensional theory of electron transport.

2. The diode of claim 1 wherein said interior and exterior portions of said collector are substantially co-planar and concentric and wherein the area of said interior portion is less than half of the area of the entire collector.

3. The diode of claim 1 wherein the interior portion of said collector which is adapted for connection to said external circuit has a given impedance and further including a shunting means having an impedance which is a fraction of said given impedance for shunting most of the interior portion collector current back to said emitter through said cylindrical metallic member.

4. The diode of claim 3 wherein said shunting means comprises a low-inductance resistor ring situated with its center coincident with the center of said interior portion of said collector and being connected electrically between said interior portion and said exterior portion.

5. The diode of claim 4 wherein said resistor ring is comprised of a plurality of discrete resistors, each resistor being connected between said interior and exterior portions, said ring being disposed in an interior groove in a ring of insulating material, and said ring of insulating material being disposed beneath said interior portion.

6. The diode of claim 5 wherein said circular interior portion of said collector has a first conically tapered portion extending therefrom, the impedance of which is matched to an exterior cable to be connected thereto, said annular exterior portion of said collector having a second conically tapered portion extending therefrom which is larger than said first conically tapered portion and which is disposed outside of said first portion.

7. The diode of claim 1 wherein said cylindrical metallic member enclosing said air space between said emitter and said collector comprises a cylindrical spacing member which may be removed and replaced with a spacing member of a different size to provide a different spacing between said emitter and said collector.

8. The diode of claim 7 further including a cylindrical housing closed by a plane circular member at one end but open at the other end enclosing said emitter, collector and spacing member, said emitter being disposed parallel to and just inside of said plane circular member and said cylindrical housing being long enough to accommodate a range of sizes of said spacing members between said metallic emitter and said metallic collector, said collector being fitted into said housing with O-rings.

9. The diode of claim 1 wherein said collector is made of lead-filled aluminum.

* * * * *